(12) United States Patent
Alex

(10) Patent No.: US 7,415,042 B1
(45) Date of Patent: Aug. 19, 2008

(54) SYSTEM AND METHOD FOR DYNAMIC INFORMATION RETRIEVAL USING A STATE MACHINE

(75) Inventor: Arun C. Alex, Mount Prospect, IL (US)

(73) Assignee: UTStarcom, Inc., Alameda, CA (US)

( * ) Notice: Subject to any disclaimer, the term of this patent is extended or adjusted under 35 U.S.C. 154(b) by 1114 days.

(21) Appl. No.: 10/370,964

(22) Filed: Feb. 19, 2003

Related U.S. Application Data

(60) Provisional application No. 60/357,779, filed on Feb. 19, 2002.

(51) Int. Cl.
*H04J 3/00* (2006.01)
*G06F 15/00* (2006.01)
*G06F 16/50* (2006.01)

(52) U.S. Cl. .......................... 370/476; 712/200; 716/3

(58) Field of Classification Search ........................ None
See application file for complete search history.

(56) References Cited

U.S. PATENT DOCUMENTS

| | | | | |
|---|---|---|---|---|
| 5,166,928 A | * | 11/1992 | Nishioka et al. | 370/465 |
| 6,055,365 A | * | 4/2000 | Tye | 716/1 |
| 6,742,107 B2 | * | 5/2004 | Jinzaki | 712/200 |

* cited by examiner

*Primary Examiner*—Steven H. D Nguyen

(57) ABSTRACT

A system and method for retrieving information from a frame. A plurality of entries is initialized in a translation table. The translation table has a plurality of rows. Each of the plurality of rows represents a state. The rows have a plurality of entries. Each of the entries corresponds to a character. An indication of a current state is maintained and a frame is received. The frame includes a plurality of characters. A selected character from the frame is chosen. A translation row is selected in the translation table corresponding to the indication of the current state. An entry is located in the selected translation row in the translation table. The entry corresponds to the selected character. The character is translated. The translated character is stored in an output buffer.

6 Claims, 7 Drawing Sheets

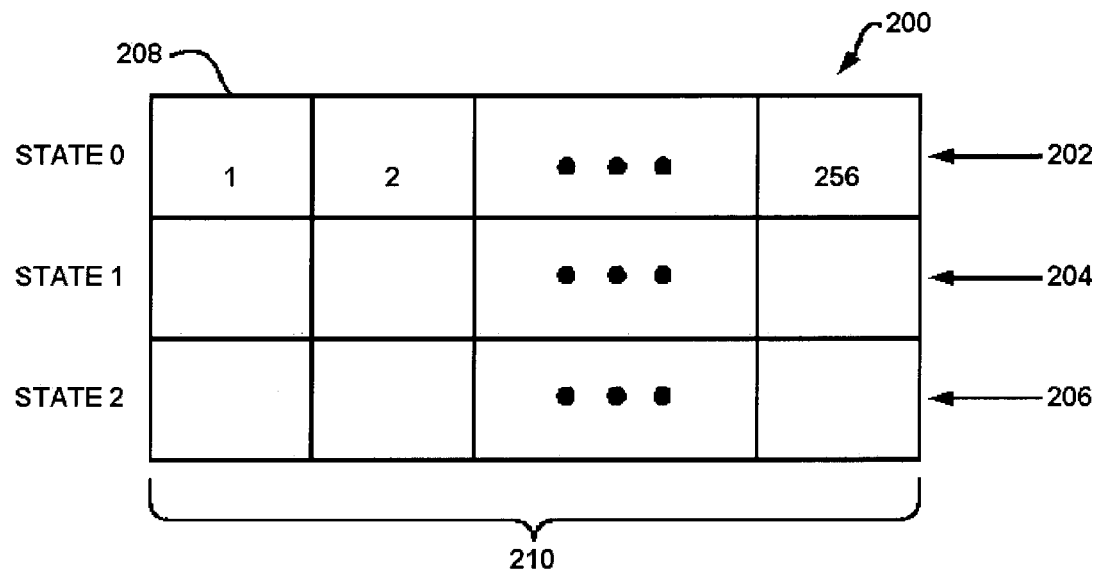

SYSTEM AND METHOD FOR DYNAMIC INFORMATION RETRIEVAL USING A STATE MACHINE

FIELD OF THE INVENTION

The present invention relates to the transmission of information across a network. More specifically, it relates to the retrieval of information using a state machine.

BACKGROUND OF THE INVENTION

High-level Data Link Control (HDLC) is a group of protocols for transmitting information between nodes in a network. In HDLC, data is organized into frames and sent across a network to a destination that verifies its successful arrival. The HDLC protocol used by the network or node may also manage the flow or pacing at which the information is sent. HDLC is one of the most commonly-used protocols in what is layer 2 of the Open Systems Interconnection (OSI) model.

In the OSI model, Layer 1 is the detailed physical level that involves actually generating and receiving the electronic signals. Layer 3 is the higher level that has knowledge about the network, including access to router tables that indicate where to forward or send data. On sending, programming in layer 3 creates a frame that usually contains source and destination network addresses. HDLC (layer 2) encapsulates the layer 3 frame, adding data link control information to a new, larger frame. Other layers also exist in the OSI model.

The Point-to-Point protocol (PPP) provides a standard method for transporting multi-protocol datagrams across point-to-point links, for example, across the Internet. PPP may be comprised of a method for encapsulating multi-protocol datagrams; a link control protocol (LCP) for establishing, configuring, and testing a data-link connection; and a family of Network Control Protocols (NCPs) for establishing and configuring different network layer protocols. The PPP packets may use HDLC-like framing. For instance, PPP may use an HDLC link layer. PPP may also use the HDLC Frame Check Sequence for error detection.

Each piece of data may be encapsulated in an HDLC frame by adding a header and a trailer to the frame. The header may include an HDLC address and an HDLC control field. The trailer may be found at the end of the frame. The trailer may include a Cyclic Redundancy Check (CRC), which detects any errors that occur during the transmission of the frame. Other fields may also be included in the frame.

A device, for example, a receiver, using the HDLC protocol may operate in any number of modes. Normally, the receiver may be in an idle state and wait for the start of a frame. The receiver may enter hunting mode wherein the receiver tries to determine the beginning of a frame. For instance, the beginning of a frame may be indicated by a special flag. The receiver may operate in other modes, as well.

SUMMARY OF THE INVENTION

The system and method of the present invention advantageously retrieves information from frames using a minimum of processor resources. The information retrieval functions may include unframing. Advantageously, the system and method may be implemented as a dynamic state machine, wherein unframing functions are accomplished using a lookup table.

In one example of the present invention, a plurality of entries may be initialized in a translation table. The translation table may have a plurality of rows. Each of the plurality of rows may represent a state. The rows may have a plurality of entries. Each of the entries may correspond to a character.

An indication of a current state may be maintained and a frame may be received. The frame may include a plurality of characters. A selected character from the frame may be chosen. A translation row may be selected in the translation table corresponding to the indication of the current state.

An entry may be located in the selected translation row in the translation table. The entry may correspond to the selected character. The character may be translated. The translated character may be stored in an output buffer.

The foregoing and other features and advantages of the system and method for performing information retrieval will be apparent from the following more particular description of preferred embodiments of the system and method as illustrated in the accompanying drawings in which like reference characters refer to the same parts throughout the different views.

BRIEF DESCRIPTION OF THE DRAWINGS

Preferred embodiments of the present inventions are described with reference to the following drawings, wherein:

FIG. 2a is a diagram illustrating one example of a translation table in accordance with a preferred embodiment of the present invention;

FIG. 2b is a diagram illustrating one example of an entry in a translation table in accordance with a preferred embodiment of the present invention;

DETAILED DESCRIPTION OF PREFERRED EMBODIMENTS

Figure 1A:
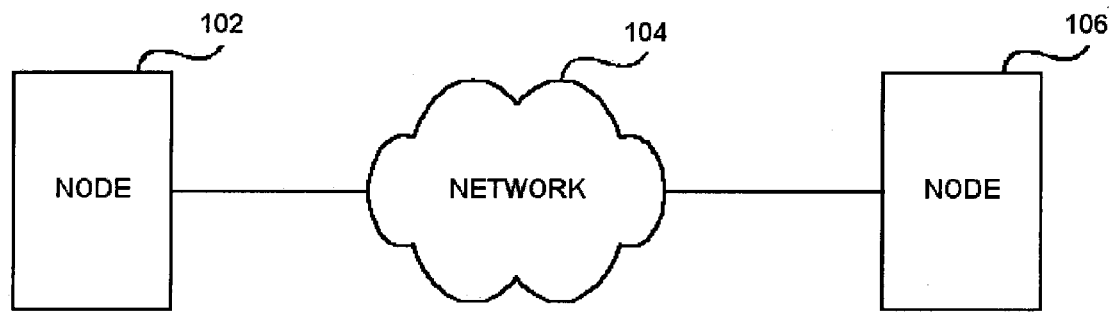
FIG. 1a is a diagram illustrating a preferred embodiment of a system for information retrieval in accordance with the present invention.

Referring now to FIG. 1a, one example of a system for retrieving information includes a first node 102, a network 104, and a second node 106. The first node 102 and the second node 106 are coupled to the network 104.

The first node 102 and the second node 106 may be any type of device capable of transmitting any type of information. For example, the first node 102 and the second node 106 may be computers, fax machines, or cellular telephones. Other examples of nodes are also possible. The first node 102 and second node 106 may include all functions related to transmitters and receivers. For example, the first node 102 may transmit frames of information to the second node 106 across the network 104. The translation tables may be stored in the nodes 102 or 106, or both nodes 102 and 106.

The network 104 may be any type of network or any combination of networks that transmit any type of information in any type of format. For example, the network 104 may be the Internet. In another example, the network 104 may be the Public Switched Telephone Network (PSTN) and the Internet. Other examples of networks and other combinations of networks are possible.

In operation, the first node 102 may transmit a frame of information to the second node 106 via the network 104. The frame may include a plurality of characters, for example, a start-of-frame character, an end-of-frame character, escape characters, and text characters.

A translation table may be created and stored in a database. The translation table may include, for example, a plurality of rows and each row may represent a state of the second node. For example, the states may be hunting, accumulation, and escaping. Each of the rows may have a plurality of entries, for instance, 256 entries representing each of 256 characters. Each of the entries may include a translated value of the character.

The second node 106 may receive the frame, determine the beginning of the frame (from the start-of frame character, translate textual and escape characters, store the translations in a buffer, and detect the end of the frame (indicated by the end-of-frame character). The translations may be accomplished by determining the current state of the node, for instance, hunting, accumulation, escaping, and successful detection, accessing the correct row of the translation table (corresponding to the current state) and translating the character.

Figure 1B:
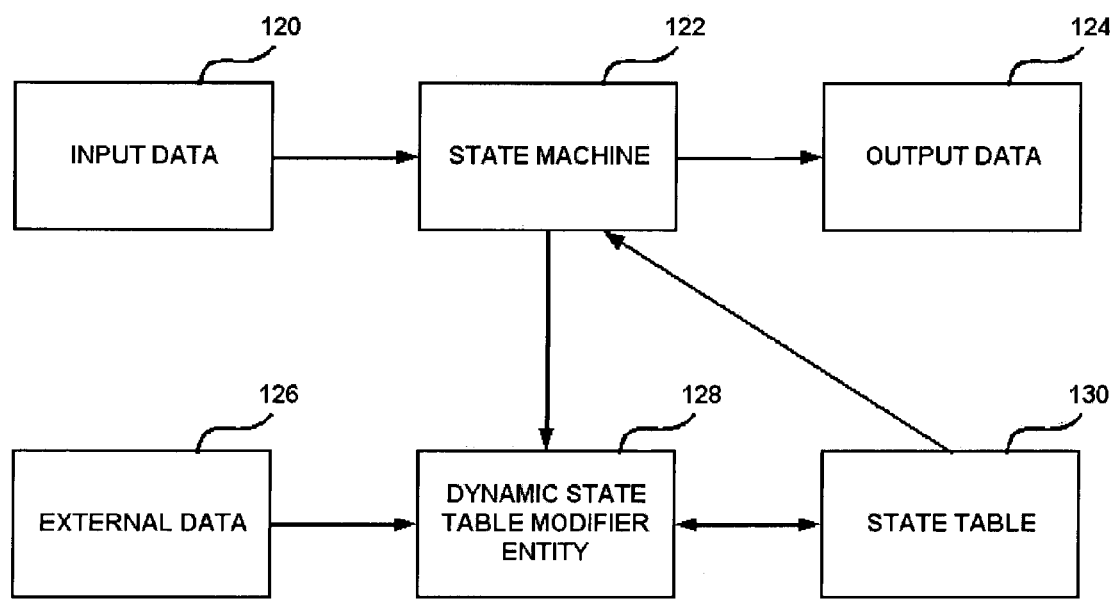
FIG. 1b is a diagram illustrating a preferred embodiment of a system for information retrieval in accordance with the present invention.

Referring now to FIG. 1b, one example of a system for retrieving information includes input data 120, state machine 122, output data 124, external data 126, dynamic state table modifier entry 128, and state table 130. The input data 120 is received by the state machine 122. The state machine 122 produces the output data 124. The state machine 122 is coupled to the dynamic state table modifier entry 128 and the state table 130. The external data 126 is input into the dynamic state table modifier entry 128. The dynamic state table modifier entry 128 is coupled to the state table 130.

The input data 120 may include any type of data, for example, PPP frames. The state machine 122, for example, an unframing core, may use the state table 130 to perform some operation, for example, unframing a PPP frame. Examples of this operation are described elsewhere in this specification. The dynamic state table modifier entry 128, for example, code that changes the asynch map, may modify the state table 130 during run time based upon the external information that was provided, for example, the asynch map. Also, the dynamic state table modifier entity 128 may modify the state table 130 based upon some input received from the operation of the state machine 122.

Referring now to FIG. 2a, one example of a translation table 200 is described. The table includes three rows 202, 204, and 206. The translation table also includes a plurality of columns 210. In this example, there are 256 columns.

The rows 202, 204, and 206 may represent states of the system. In one example, row 202 represents a first state. Row 204 represents a second state. Row 206 represents a third state.

The first state may indicate that the system is hunting for the start of the packet and may have a numerical index of "0". The second state may indicate that the system is accumulating a frame and have an index of "1." The third state may indicate that that an escape character was detected and escaping in to be performed and may have an index of "2." In other words, the system is finished accumulating a frame.

Other states may also exist, although they may not have associated rows in the state transition table. A fourth state having an index of "3" may indicate that the frame was detected successfully. The fourth state may not have associated entries in the state transition table because the frame has been successfully detected.

Referring now to FIG. 2b, one example of an entry in the translation table of FIG. 2a is described. A translation table entry 230 includes a state index field 232, accept field 234, unused field 236, and translated character field 238.

The state index field 232 indicates the state. For example, two bits may be used to indicate whether the state associated with the character is state 0, state 1, or state 2.

The accept field 234 may indicate whether the character is to be accepted in a particular state. For example, a "0" may indicate that the character is not accepted in the state, and a "1" may indicate that the character is accepted in the state.

The unused field 236 may be five bits in length. The field may be used for other applications or future applications.

The translated character field 238 may be an eight-bit field and indicate the translated character. For example, a character may be transformed into another character by means of a mathematical transformation. In cases where mathematical transformation is computationally expensive, all or part of the transformation may be accomplished by looking up characters in a table filled with precomputed values.

Figure 3:
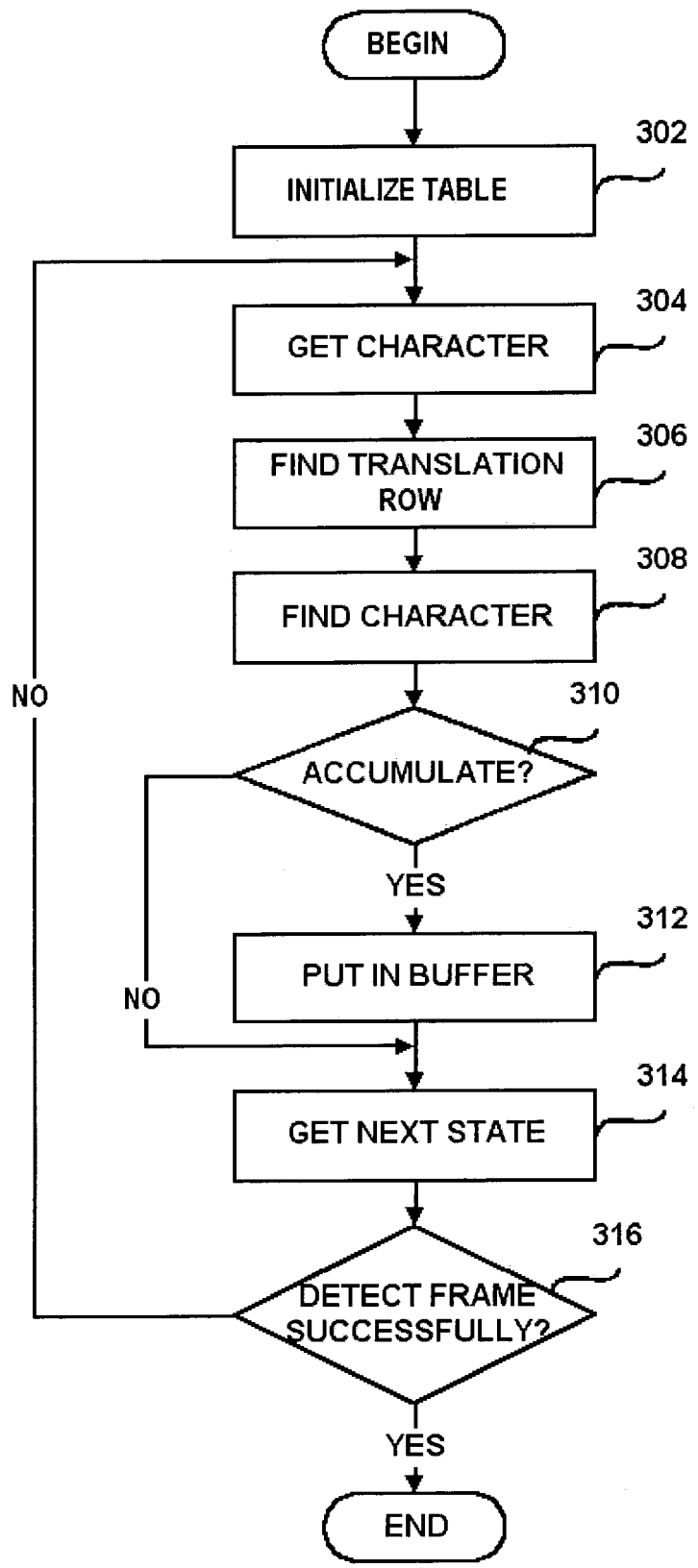
FIG. 3 is a flowchart illustrating one example of unframing in accordance with a preferred embodiment of the present invention.

Referring now to FIG. 3, one example of performing unframing is described. At step 302, the translation table is initialized. For example, the state translation table may include a row for every state and an entry for each character in each of these rows. In one example, each row of the decode table has 256 entries, one entry for each character. Each entry of the decode table is sixteen bits long, and is bit-mapped. Bits 0 and 1 may be the state index. Bit 2 may decide whether the character is accepted in this state or not. Bits 3-7 may be unused. Bits 8-15 may store the translated character. The translation table may be initialized in multiple stages.

At step 304, a character is obtained. For example, the system may search an input buffer to find the next character.

At step 306, the row in the translation table is determined. In one example, a variable indicating the current state may be used as an index. The index may indicate the proper row corresponding to the current state.

At step 308, the character in the row is determined. For example, if the input character is "a", the system determines where the entry in the translation table row for "a" is located.

At step 310, it is determined whether the character should be accumulated. If the answer is affirmative at step 310, then execution continues at step 312. If the answer at step 310 is negative, then execution continues at step 314.

At step 312, the character is put in a buffer. For example, there may be an output buffer and the translated character may be loaded into the output buffer.

At step 314, the next state is obtained. For example, the system may look at the bits of the entry in the translation table entry to determine what the next state entry should be.

At step 316, it is determined whether the frame has been detected successfully. If the answer is affirmative, then execution ends. If the answer is negative, then execution continues at step 304.

Figure 4:
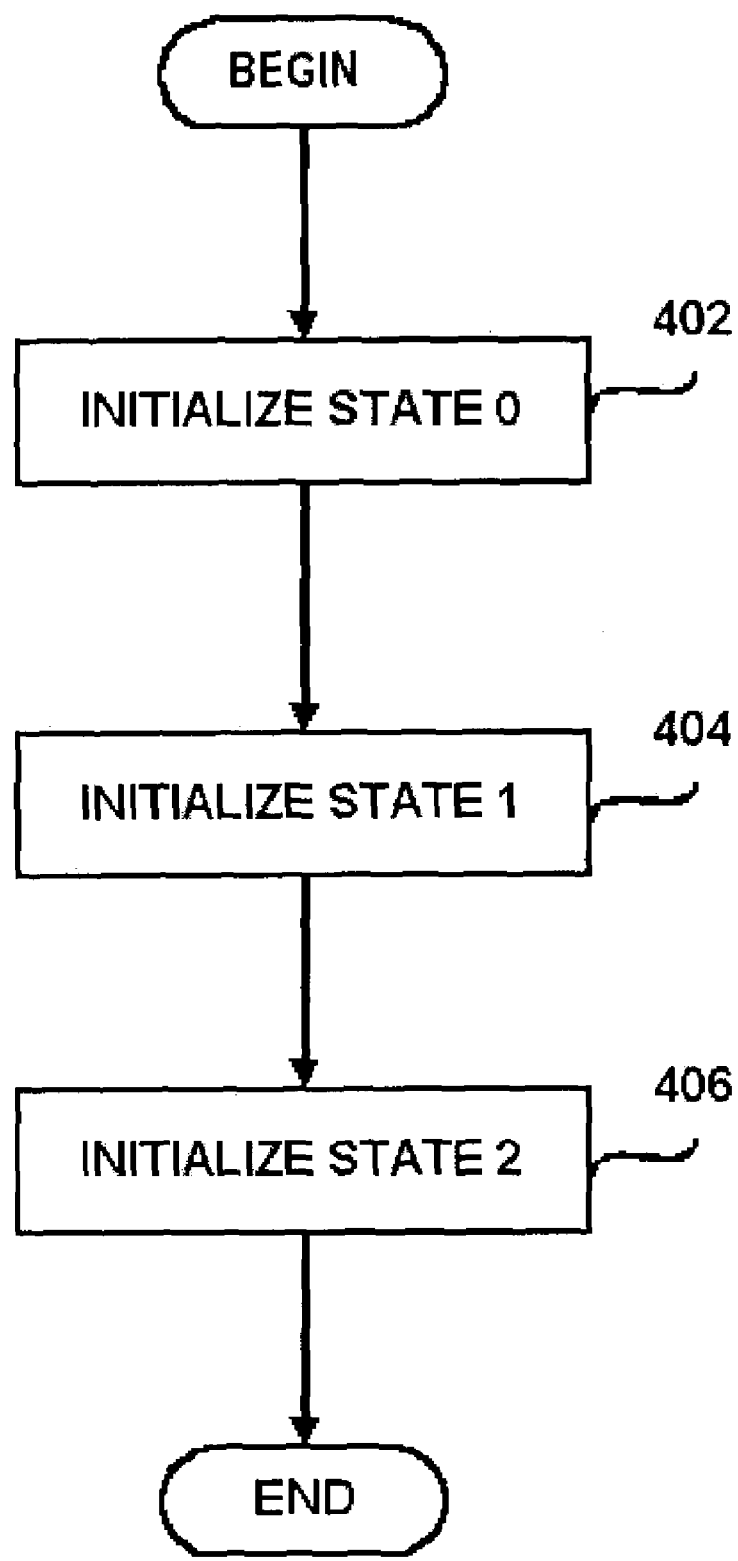
FIG. 4 shows a flowchart of one example of initialization of the translation table in accordance with a preferred embodiment of the present invention.

Referring now to FIG. 4, one example of initializing a translation table is described.

At step 402, the row in the translation table representing the hunting state (state 0) is initialized. The translated character (in the translated character field may be set to zero). In the state all characters except the start of frame character (e.g., hex value "0x7e") may be considered to be invalid. All characters may be discarded during this state and the accept flag may be set to false for all characters in the state. In one example, all the characters in the state 0 row may have accept fields set to 0.

At step 404, the row in translation table representing the character accumulation state is initialized. For example, the system may use the asynch map for filling in the translation value. An async map may be a list containing the characters on which certain transformation (e.g., applying the binary exclusive-or operation with hexadecimal character 20) needs to be applied.

At step 406, the row in the translation table representing the escaping state is initialized. When the escape character is detected, the system processes the character. In other words, the character is always translated. The translated character may be placed in the output buffer.

Figure 5:
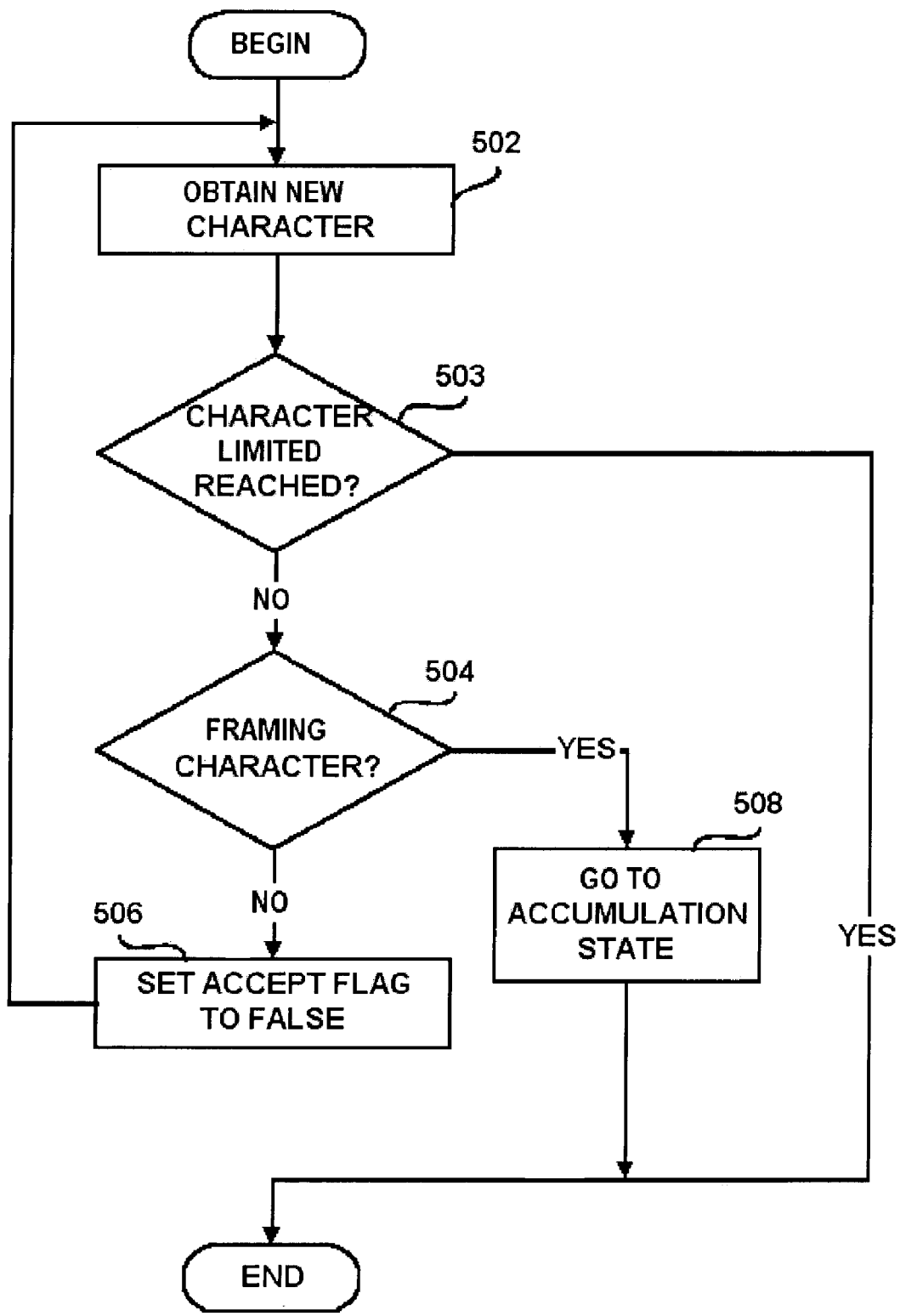
FIG. 5 shows a flowchart of one example of the initialization of the translation table in the hunting state in accordance with a preferred embodiment of the present invention.

Referring now to FIG. 5, one example of initializing the row in the translation table relating to the hunting state is described. The elements in the row may be of the format of FIGS. 2a and 2b.

At step 502, a character is obtained. The character may be obtained from an input buffer. At this point, the system is looking to detect the start of the frame. At step 503, it is determined whether the character limit has been reached. For example, there may 256 characters to be initialized. If the answer is affirmative, then execution ends. If the answer is negative, execution continues at step 504.

At step 504, it is determined whether a start of frame character has been detected. For example, if the start of frame character is defined to be hex value "0x7e", then the system can compare the value of the character to "0x7e." If the answer at step 504 is affirmative, then execution continues at step 508. If the answer at step 504 is negative, then execution continues at step 506.

At step 506, the accept flag for the character (within the row of the translation table representing the hunting state) is set top false. Setting the flag to false has the effect of discarding the character in the hunting state. Execution continues at step 502.

At step 508, the state indicator is set to the accumulation state. In this case, control may pass to a module, which processes characters for the accumulation state.

Figure 6:
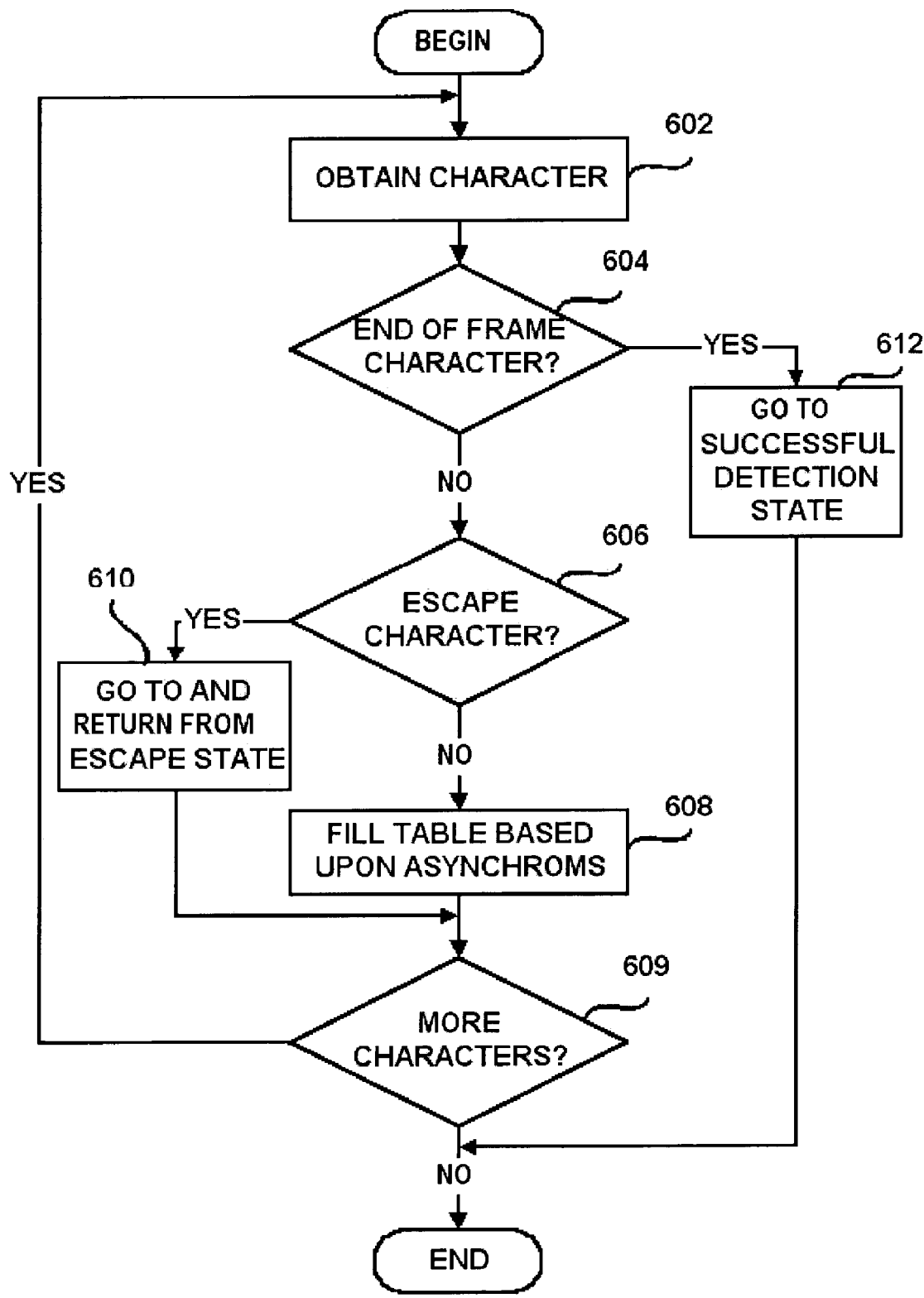
FIG. 6 shows a flowchart of one example of the initialization of the translation table in the accumulation state in accordance with a preferred embodiment of the present invention.

Referring now to FIG. 6, one example of initializing the row of the translation table relating to the accumulation state is described.

At step 602, a character is obtained. For example, the character may be obtained and stored in an input buffer. At step 604, it is determined whether the character is an end-of-frame character. In one example, the end-of-frame character is hex "0x7e" and the system determines whether this value has been obtained. If the answer is affirmative, then execution continues at step 612. If the answer at step 604 is negative, then execution continues at step 606.

At step 606, the system determines whether an escape character has been encountered. In one example, the end-of-frame character is hex "0x7d" and the system determines whether this value has been obtained. If the answer is affirmative, then execution continues at step 610. If the answer at step 604 is negative, then execution continues at step 608.

At step 608, the row entry for the character is filled. For example, the asynch map for a call may be used to fill in the entry. If the character corresponding to the entry is in the async map, then the entry is filled with an escaped character. Otherwise, it is filled with a normal character. Control continues at step 609.

At step 609, the system determines whether there are any more characters to process. If the answer is affirmative, then execution continues at step 602. If the answer is negative, then execution ends.

At step 610, the system may set the state equal to the escape state and executes a routine that handles characters in the escape state. After this routine is executed, control returns to step 609.

At step 612, the system goes to the successful detection state. In this state, the frame is recognized.

Figure 7:
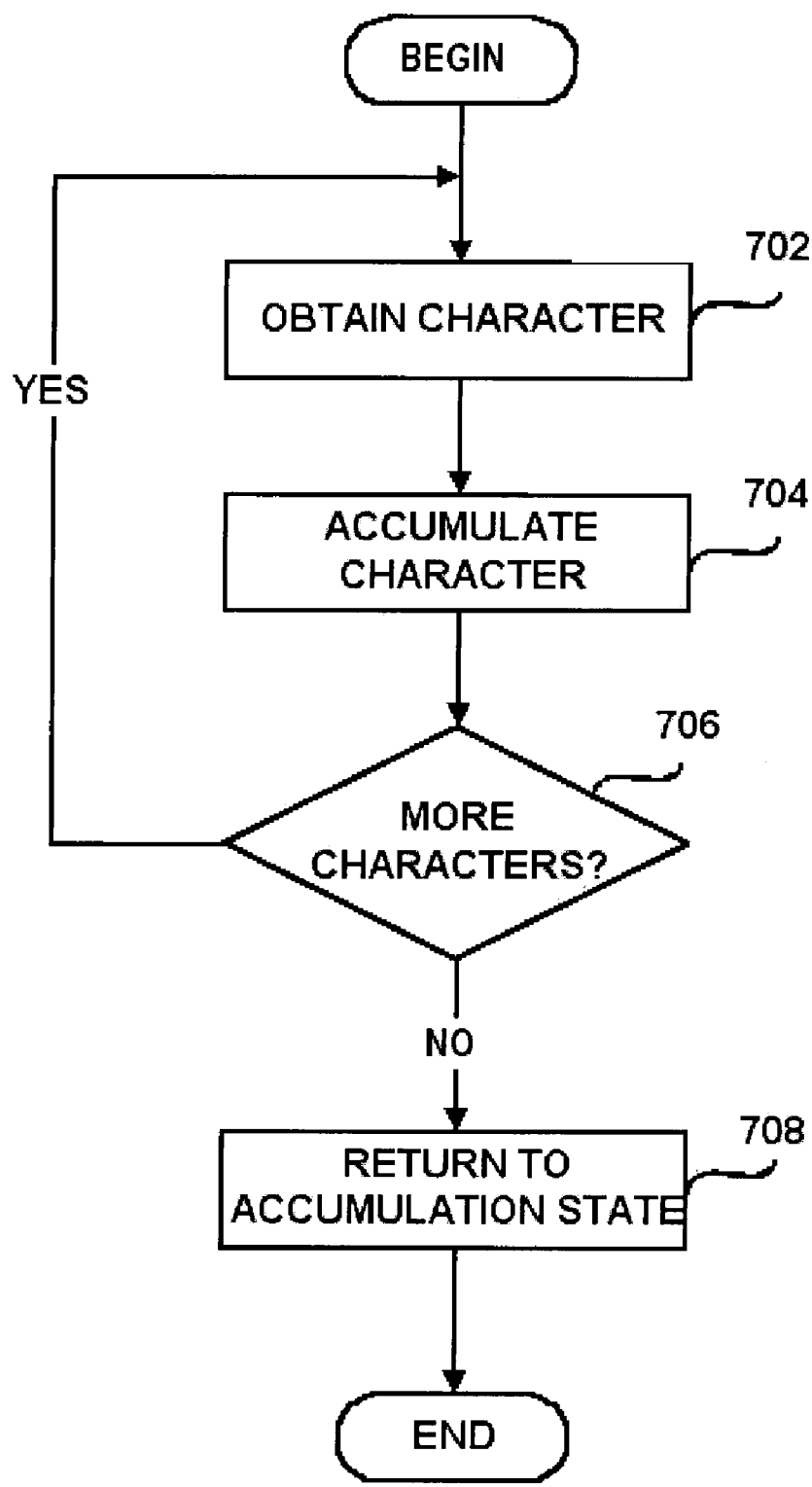
FIG. 7 shows a flowchart of one example of the initialization of the translation table in the escaping state in accordance with a preferred embodiment of the present invention.

Referring now to FIG. 7, one example of initializing the row of the translation table relating to the escaping state is described.

At step 702, the next character is obtained. For example, there may 256 characters in the row and an index may be incremented to move from one character to the next. At step 704, the character is accumulated. For example, the character may be stored in a buffer. At step 706, it is determined whether there are any more characters to accumulate. If the answer is affirmative, then execution continues at step 702. If the answer is negative, then execution continues at step 708. At step 708, the system returns to the accumulation state.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for performing information retrieval may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method for retrieving information from a PPP frame using a state machine and a translation table, wherein the translation table includes rows representing hunting, accumulation, and escaping states, the method comprising:

initializing a plurality of entries in the translation table, the translation table having a plurality of rows, each of the plurality of rows representing a state, the rows having a plurality of entries, each of the entries corresponding to a character;

maintaining an indication of a current state of the state machine;

receiving a PPP frame, the PPP frame including a plurality of characters and choosing a selected character from the PPP frame;

selecting a translation row in the translation table corresponding to the indication of the current state;

locating an entry in the selected translation row in the translation table, the entry corresponding to the selected character;

translating the character;

storing the translated character in an output buffer; and updating the current state of the state machine to a next state, wherein the states include hunting, accumulation and escaping states.

2. The method of claim 1 wherein the step of initializing uses an asynch map.

3. The method of claim 1 wherein each row of the translation table includes 256 entries, each of the entries representing a character.

4. A system for retrieving information from a frame using a state machine and a translation table, wherein the translation table includes rows representing hunting, accumulation, and escaping states, comprising:

means for initializing a plurality of entries in the translation table, the translation table having a plurality of rows, each of the plurality of rows representing a state, the rows having a plurality of entries, each of the entries corresponding to a character;

means for maintaining an indication of a current state of the state machine;

means for receiving a frame, the frame including a plurality of characters and choosing a selected character from the frame;

means for selecting a translation row in the translation table corresponding to the indication of the current state;

means for locating an entry in the selected translation row in the translation table, the entry corresponding to the selected character;

means for translating the character;

means for storing the translated character in an output buffer; and updating the current state of the state machine to a next state, wherein the states include hunting, accumulation and escaping states.

5. The system of claim 4 wherein the means for initializing uses an asynch map.

6. The system of claim 4 wherein each row of the translation table includes 256 entries, each of the entries representing a character.

* * * * *